(12) United States Patent
Muniz et al.

(10) Patent No.: US 7,501,591 B1
(45) Date of Patent: Mar. 10, 2009

(54) DEVICE FOR MEASURING AND ANNUNCIATING WEIGHT OF LUGGAGE ARTICLES

(76) Inventors: Cesar Muniz, 494 SW. 185th Ter., Miramar, FL (US) 33029; Angel Muniz, 494 SW. 185th Ter., Miramar, FL (US) 33029

( * ) Notice: Subject to any disclaimer, the term of this patent is extended or adjusted under 35 U.S.C. 154(b) by 0 days.

(21) Appl. No.: 11/897,112

(22) Filed: Aug. 29, 2007

(51) Int. Cl.
*G01G 19/58* (2006.01)
*G01G 19/14* (2006.01)

(52) U.S. Cl. ........................... 177/131; 177/148
(58) Field of Classification Search ............. 177/131, 177/148, 149
See application file for complete search history.

(56) References Cited

U.S. PATENT DOCUMENTS

| | | | |
|---|---|---|---|
| 3,090,454 A | 5/1963 | Farrar et al. | |
| 4,913,248 A | 4/1990 | Zakai | |
| 4,936,399 A * | 6/1990 | Christman et al. | 177/210 C |
| 7,238,895 B2 * | 7/2007 | Dittrich et al. | 177/126 |
| 7,271,353 B1 * | 9/2007 | Lewis | 177/131 |
| 7,358,449 B2 * | 4/2008 | Hannon | 177/25.13 |
| 2005/0051586 A1 | 3/2005 | Siwak et al. | |
| 2006/0207850 A1 * | 9/2006 | Lewis | 190/115 |
| 2007/0007048 A1 * | 1/2007 | Gill | 177/131 |

FOREIGN PATENT DOCUMENTS

| | | |
|---|---|---|
| DE | 2060208 | 6/1972 |
| GB | 2385142 | 8/2003 |

* cited by examiner

*Primary Examiner*—Randy W Gibson
(74) *Attorney, Agent, or Firm*—James Ray & Associates

(57) ABSTRACT

A device for measuring and annunciating weight of a luggage article having a carrying member includes a handle and a load measuring member which is operatively secured to the handle for generating an output signal. A hook shaped member is mounted for a vertical movement within the handle and applies force to the load measuring member when the luggage article is lifted, whereby the load measuring member is responsive to the applied load to generate the output signal which is indicative of the weight of such luggage article. A controller is mounted within the handle and has a processing member which is connected to a source of electrical power supply and which is responsive to receipt of the generated output signal to determine weight of the luggage article which is then displayed on a display which is operably connected to the processing member.

15 Claims, 3 Drawing Sheets

DEVICE FOR MEASURING AND ANNUNCIATING WEIGHT OF LUGGAGE ARTICLES

FIELD OF THE INVENTION

The present invention relates, in general, to weight measurement devices and, more particularly, this invention relates to a device for measuring and annunciating weight of luggage article or its preset limit condition.

BACKGROUND OF THE INVENTION

As is generally well known, airlines mandate sizes of the luggage articles that can be carried aboard the aircraft and further mandate weight limit of luggage articles that can be loaded onto the aircraft without inquiring additional expense when such weight limit is exceeded. Unfortunately, determining weight of the luggage article during packing, particularly, a large luggage article is a challenging task. Regular weight scales have a smaller than needed surface in order to accurately weigh luggage articles of all types. Thus, many travelers are tasked with undesirable effort of repacking at the airport due to exceeding the mandated weight limits often causing bottlenecks at the check-in counters and inconvenience to others.

Prior to the present invention, efforts have been made to alleviate difficulties associated with determining weight of the packed luggage article. U.S. Pat. No. 3,090,454 issued to Farrar et al. and U.S. Pub. No. 2005/0051586 to Siwak at al. disclose weight determining mechanisms which are incorporated into a handle of such luggage article. While being sufficient to determine the weight, such prior art provides for higher than desirable cost of each luggage article.

UK Patent Application GB 2,385,142 to Ghosh discloses a U-shaped elongated device that can be slipped under the handle and pulled up to determine the weight which may be displayed or audibly annunciated.

German Patent Application DE 2060208 shows another type of the weight determining device that employs a pair of hooks which are stationary attached to a handle and which are used to releaseably engage a carrying member of the luggage article. However, there is a continuing need for an improved device for determining weight of the luggage article.

SUMMARY OF THE INVENTION

According to one embodiment, the invention provides a device for measuring and annunciating weight of a luggage article having a carrying member. The device includes a handle. The handle has a first portion with a top surface and a bottom surface. A second portion of the handle has a top surface thereof spaced from the bottom surface of the first portion and disposed generally parallel thereto. A third portion of the handle connects generally aligned ends of the first portion and the second portion, wherein the handle is formed as a generally U-shaped member. The device further includes a load measuring member which is operatively secured to the second portion of the handle for generating an output signal. A hook shaped member has each of a luggage engagement portion and a load applying portion. The load applying portion is mounted for a vertical movement within the second portion of the handle and moves downwardly when the luggage engagement portion is hooked onto the carrying member and such luggage article is lifted by way of the handle causing the load applying portion to engage the load measuring means and apply force thereto. The load measuring means generates the output signal in response to the applied load which is indicative of the weight of such luggage article. A controller is mounted within the first portion of the handle and which has a processing means connected to a source of electrical power supply and being responsive to receipt of the generated output signal for determining weight of the luggage article which is then displayed on a display which is operably connected to the processing means.

According to another embodiment of the invention, there is provided a device for measuring and annunciating weight of luggage article having a carrying member. The device includes an elongated handle having each of a predetermined size and a predetermined shape. A pair of mounting members are provided with each mounting member disposed on and secured to a bottom surface of the handle at a respective end thereof. There is a pair of load measuring members with each load measuring member being operatively attached to a respective one of the pair of mounting members for generating an output signal. A pair of hooks are provided, each having a luggage engagement portion and a load applying portion which is mounted for a vertical movement within the each mounting member and which moves downwardly when the luggage engagement portion is hooked onto the carrying member and such luggage article is lifted by way of the handle causing each load applying portion to engage a respective one of the pair of load measuring member and apply force thereto, whereby each load measuring member generates the output signal in response to the applied load and whereby a combination of the generated output signals is indicative of the weight of such luggage article. A controller has a processing means which is connected to a source of electrical power supply and which is responsive to receipt of the combination of generated output signals to determine weight of the luggage article which is then displayed on a display operably connected to the processing means.

OBJECTS OF THE INVENTION

It is, therefore, one of the primary objects of the present invention to provide a device for determining weight of a luggage article.

Another object of the present invention is to provide a device for determining weight of a luggage article which releaseably engages its carrying member during use.

Yet another object of the present invention is to provide a device for determining weight of a luggage article which displays determined weight.

A further object of the present invention is to provide a device for determining weight of a luggage article which audibly annunciates a condition when the determined weight exceed a predetermined limit.

Yet a further object of the present invention is to provide a device for determining weight of a luggage article which is capable of displaying determined weight in both pounds and kilograms.

An additional object of the present invention is to provide a device for determining weight of a luggage article which employs a vertically movable member that hooks onto the carrying member of such luggage article and which activates a load cell when such luggage article is being lifted.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 2:
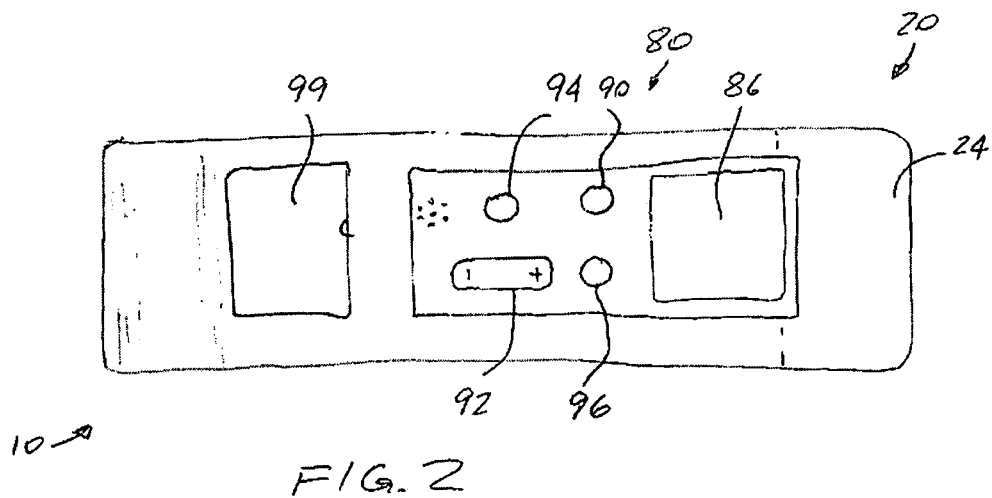
FIG. 2 is a top view of the device for measuring and annunciating weight of luggage articles of FIG. 1.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a piece of luggage applies to a hand bag, case, suitcase, carry-on case, travel case, garment carrier, duffle bag, backpack and like devices for holding clothing, personal belongings or other articles therein.

Reference is now made, to FIGS. 1-5, wherein there is shown a device, generally designated 10, which is constructed according to one embodiment of the invention for measuring and annunciating weight of a luggage article 2 having a carrying member 4. The device 10 includes a handle, generally designated as 20. The handle 20 includes a first elongated portion 22 having a top surface 24 and a bottom surface 26. A second elongated portion 30 has a top portion 32 thereof which is spaced from the bottom surface 26 of the first portion 22 and which is disposed generally parallel thereto. A third portion 40 connects generally aligned ends of the first portion 22 and the second portion 30, wherein the handle 20 is formed as a generally U-shaped member.

A load measuring means is operatively secured to the second portion 30 of the handle 20 for generating an output signal. In the presently preferred embodiment of the invention, such load measuring means includes a load cell 50, preferably of a strain gage type. The structure and operation of a strain gauge load cell 50 is well known in the art and does not form part of the present invention. For the sake of reader's convenience in understanding the present invention, the strain gauge load cell 50 converts force applied thereto into an electrical signal. The strain gauges 52 themselves are bonded onto a structural member 54 which has at least a portion thereof capable of deforming under applied load and are generally connected in what is well known in the art as a Wheatstone bridge circuit. Thus, the electrical resistance of one of the gauges in Wheatstone bridge circuit changes in proportion to the applied load. It is also within the scope of the present invention to employ other types of load cells 50 such as piezoresistive, inductive, reluctance, and magnetostrictive.

A hook shaped member, generally designated as 60, has each of a luggage engagement portion 62 and a load applying portion 70. The load applying portion 70 is mounted for a vertical movement within a cavity 36 formed in the second portion 30 in open communication with the bottom surface 34 thereof when the luggage engagement portion 26. The load applying portion 70 moves downwardly when the luggage engagement portion 62 is hooked onto the carrying member 4 and such luggage article 2 is lifted by way of the handle 20 causing the load applying portion 70 to engage the load measuring means 50 and apply force thereto, whereby the load measuring means 50 generates the output signal in response to the applied load which is indicative of the weight of such luggage article 2.

The luggage engagement portion 62 includes a first elongated leg 64 which is disposed generally horizontally when such luggage article 2 is being lifted. Such first elongated leg 64 is sized to operably engage the carrying member 4. A second elongated leg 66 is connected at a first end thereof to a first end of the first elongated leg 64 and is disposed in a generally vertical direction and at a predetermined angle thereto. A third leg 68 is connected at a first end thereof to a second end of the first elongated leg 64 and is disposed in a generally vertical direction so that the first leg 64 is maintained in the generally horizontal position when such luggage article 2 is being lifted. Alternatively, the luggage engagement portion 62 may be formed as a curved hook.

Figure 1:
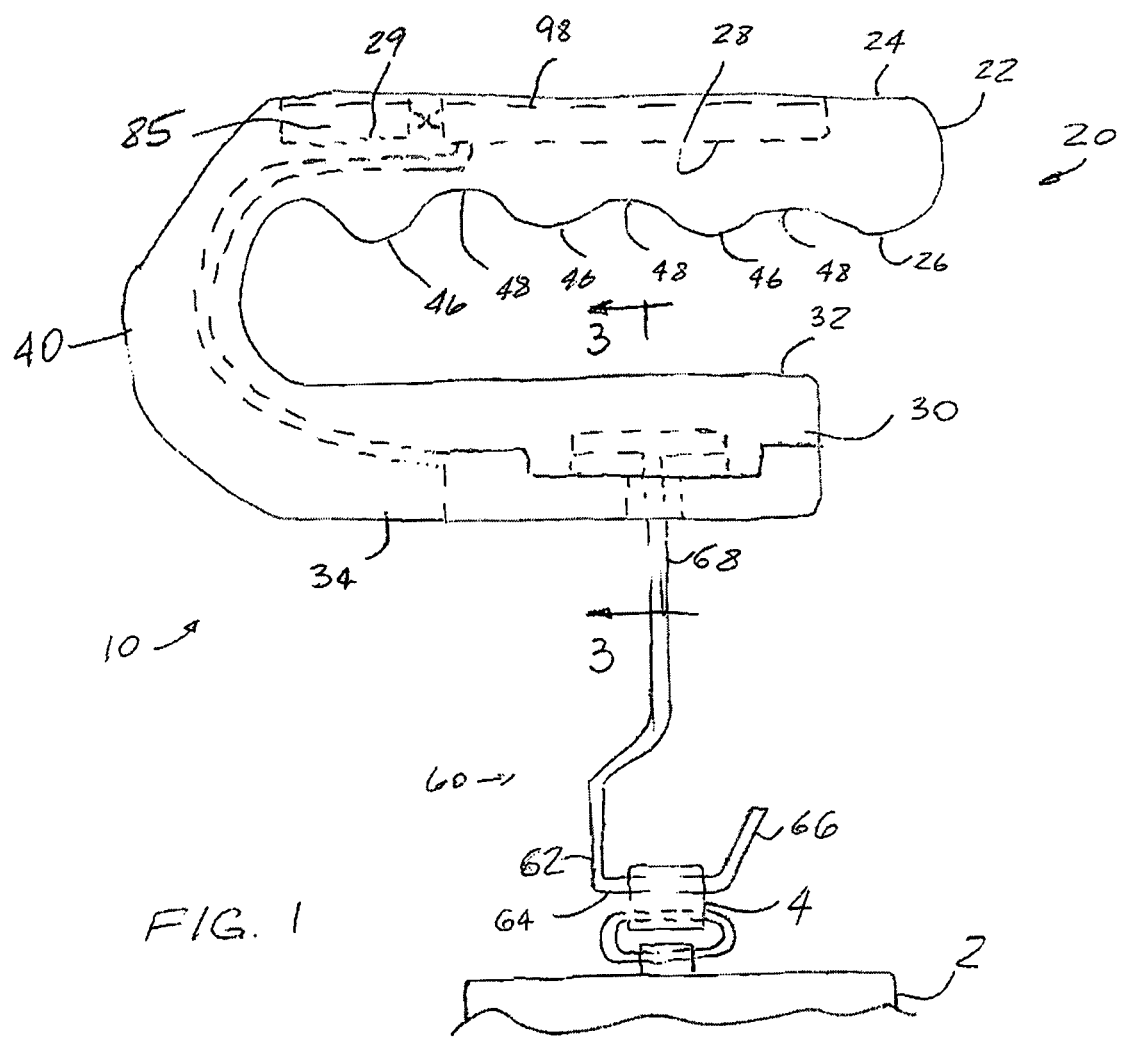
FIG. 1 is a front elevation view of a device for measuring and annunciating weight of luggage articles which is constructed according to one embodiment of the invention.
Figure 4:
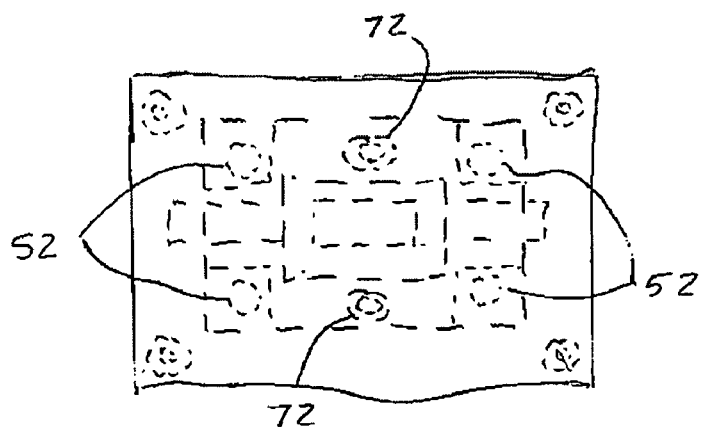
FIG. 4 is a partial top view of the device for measuring and annunciating weight of luggage articles of FIG. 3.
Figure 3:
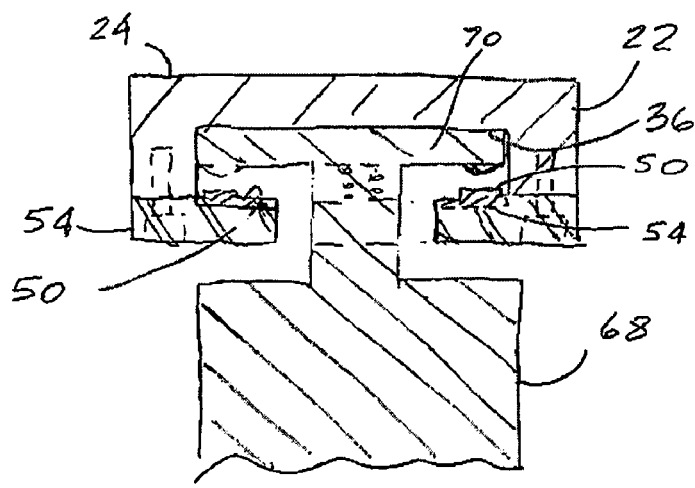
FIG. 3 is a cross-sectional view of the device for measuring and annunciating weight of luggage articles along lines 3-3 of FIG. 1.

The load applying portion 70 is generally planar and is secured to a second end of the third leg 68. The load applying portion 70 is mounted horizontally within the cavity 36 of the second portion 30 of the handle 20. At least one bias spring 72 is provided for biasing the load applying portion 70 upwardly and away from contacting the load measuring means 50 in normal non-operating condition of the device 10. Although, the load applying portion 70 is shown in FIG. 1, as being configured symmetrically about the third leg 68, other configurations may be employed in the present invention.

A control means, generally designated as 80, is mounted within a cavity 28 which is formed within the first portion 22 and in open communication with the top surface 24. The control means 80 has a processing means 82 connected to a source of electrical power supply 84 and which is responsive to receipt of the generated output signal from the load measuring means 50 to display weight of such luggage article on a display 86 which is operably connected to the processing means 82 and which is viewable from the top surface 24 of the first portion 22. Preferably, the processing means 82 is of a microprocessor type.

The control means 80 further includes an alarm means 88 which is operably connected to the processing means 82 for annunciating a condition wherein the weight of the luggage article 2 is equal to or exceeds the preselected weight being stored within the processing means 82. A switch means 90 is provided for turning the device 10 ON and OFF. Another switch means 92 is provided for enabling the user of the device 10 to preselect a weight of such luggage article 2 to be annunciated. An optional manually operable selector switch means 94 may be provided for enabling the user to selectively turn the alarm means 88 ON and OFF. It is also within the scope of the present invention to provide a selector switch means 96 for enabling the user of the device 10 to selectively display the weight in one of pounds and kilograms. It is desirable to enclose the control means 80 being mounted within the cavity 28 and, accordingly, an enclosure 98 is provided for such purposes.

It is also presently preferred to include the source of the electrical power supply 84 and, accordingly, at least one battery 85 is operably mounted within a cavity 29 which is formed in the first portion 22 of the handle 20 and wherein the device 10 includes a cover means 99 for selectively covering and uncovering the at least one battery 85.

To improve handling control of the device 10, a grip means is disposed on and secured to the bottom surface 26 of the first portion 22 of the handle 20. Such grip means includes a plurality of spaced-apart ribs 46 formed on the bottom surface 26 of the first portion 22 and plurality of concave recesses 48 each formed between a pair of adjacently disposed ribs 46.

In operation, the user simply hooks the luggage engagement portion 62 onto the carrying member 4, lifts the luggage article 2 by way of grasping the first portion 22 of the handle 20 and determines the weight of such luggage article 2. When the weight is determined, the user simply unhooks the device 10 from the carrying member 4 for further use on the same or different luggage article 2.

Figure 6:
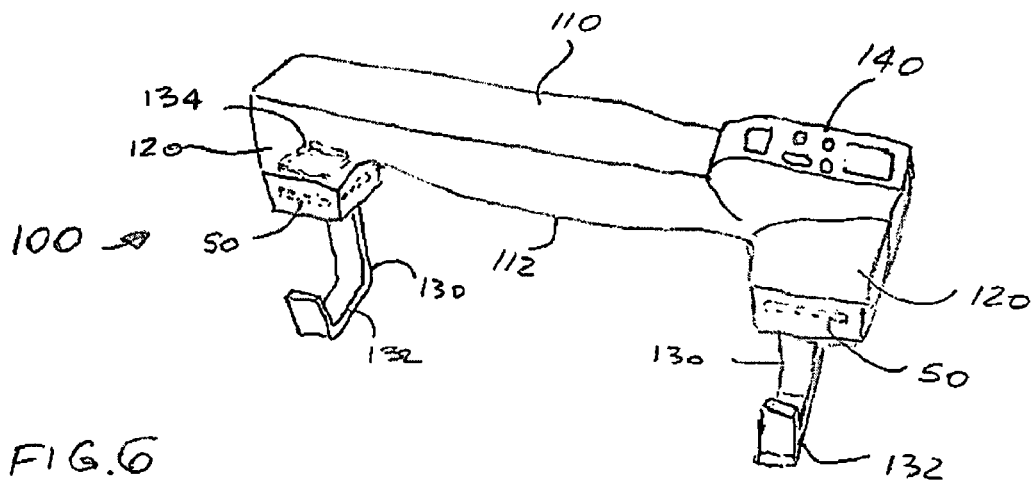
FIG. 6 is a perspective view of a device for measuring and annunciating weight of luggage articles which is constructed according to another embodiment of the invention.
Figure 5:
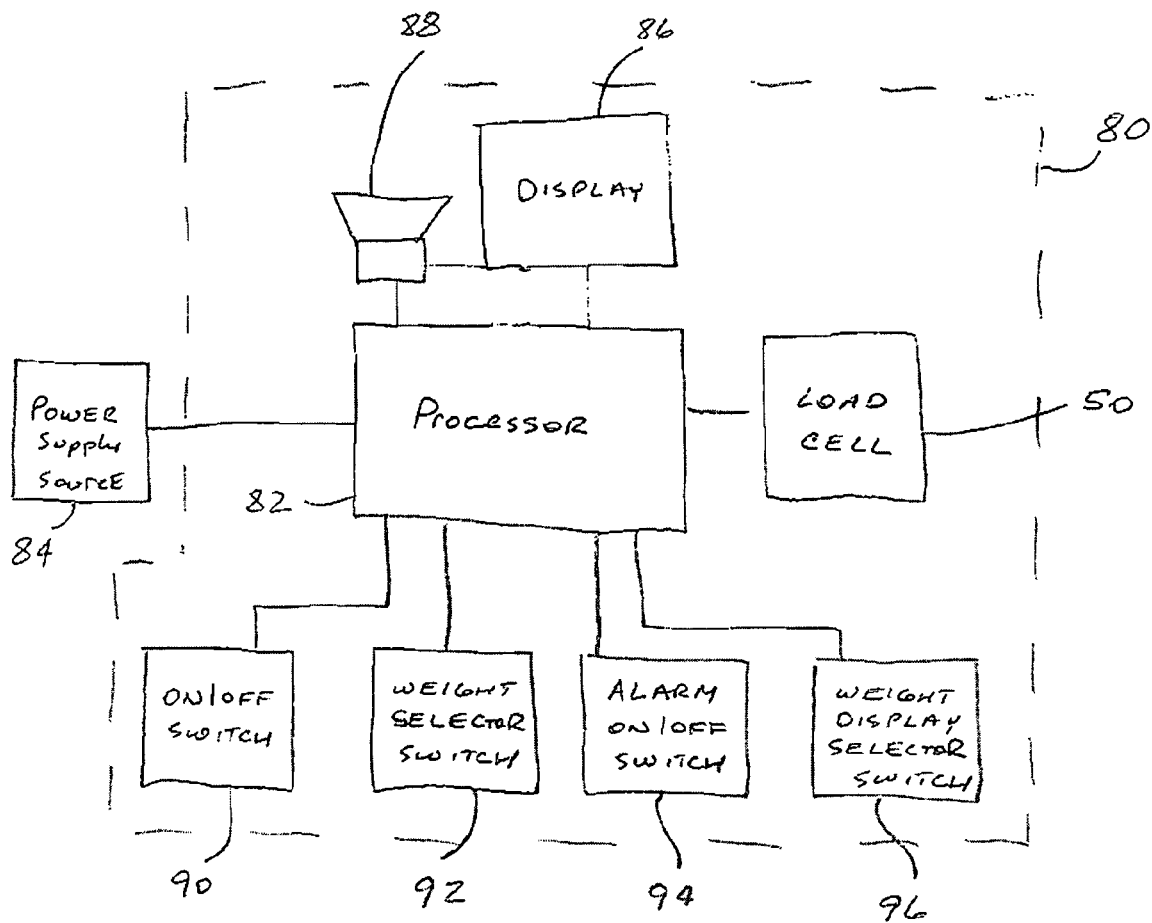
FIG. 5 is a block diagram of the device for measuring and annunciating weight of luggage articles of FIG. 1.

According to another embodiment of the invention, there is provided a device, generally designated as 100, for measuring and annunciating weight of luggage article having a carrying member. Now in reference to FIG. 6, the device 100 includes an elongated handle 110 having each of a predetermined size and a predetermined shape. A pair of mounting abutment means 120 are provided, wherein each mounting abutment means 120 is disposed on and secured to a bottom surface 112 of the handle 100 at a respective end thereof. Preferably, the mounting abutment means 120 are formed integral with the handle 110. There is a pair of load measuring means, wherein each load measuring means is operatively attached to a respective one of the pair of abutment means 120 for generating an output signal. In the presently preferred embodiment of the invention, such load measuring means includes a load cell 50, preferably of a strain gage type. A pair of hooks 130 is provided, wherein each hook 130 has a luggage engagement portion 132 and a load applying portion 134 which is mounted for a vertical movement within the each mounting abutment means 120 when the luggage engagement portion 132 is hooked onto the carrying member 4 and such luggage article 2 is lifted by way of the handle 110 causing each load applying portion 134 to engage a respective one of the pair of load measuring devices 50 and apply force thereto, whereby the each load measuring means 50 generates the output signal in response to the applied load and whereby a combination of the generated output signals is indicative of the weight of such luggage article 2. A control means 140 is provided for receiving the combination of generated output signals and for displaying weight of such luggage article 2. For the sake of brevity the control means 140 is identical to the control means 80, described in details above, except that control means 140 are capable of receiving a pair of output signals and processing them to determine the weight of the luggage article 2.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A device for measuring and annunciating weight of a luggage article having a carrying member, said apparatus comprising:
   (a) a handle including:
      (i) a first portion having a top surface and a bottom surface,
      (ii) a second portion which has a top surface thereof spaced from said bottom surface of said first portion and disposed generally parallel thereto, and
      (iii) a third portion which connects generally aligned ends of said first portion and said second portion, wherein said handle is formed as a generally U-shaped member;
   (b) a load measuring means operatively secured to said second portion of said handle for generating an output signal;
   (c) a hook shaped member having each of a luggage engagement portion and a load applying portion, said load applying portion is mounted for a vertical movement within said second portion of said handle and moves downwardly when said luggage engagement portion is hooked onto said carrying member and said luggage article is lifted by way of said handle causing said load applying portion to engage said load measuring means and apply force thereto, whereby said load measuring means generates said output signal in response to said applied load, said generated output signal is indicative of the weight of such luggage article; and
   (d) a control means which is mounted within said first portion of said handle and which has a processing means connected to a source of electrical power supply and being responsive to receipt of said generated output signal for determining weight of said luggage article which is then displayed on a display which is operably connected to said processing means.

2. The device, according to claim 1, wherein said load measuring means is a strain gage load cell.

3. The device, according to claim 1, wherein said luggage engagement portion includes a first elongated leg which is disposed generally horizontally when such luggage article is being lifted, a second elongated leg which is connected at a first end thereof to a first end of said first elongated leg and which is disposed in a generally vertical direction and at a predetermined angle thereto, and a third leg which is connected at a first end thereof to a second end of said first elongated leg and which is disposed in a generally vertical direction so that said first leg is maintained in said generally horizontal position when such luggage article is being lifted.

4. The device, according to claim 3, wherein said load applying portion is secured to a second end of said third leg and which is disposed perpendicular thereto, said member being horizontally mounted within said second portion of said handle, and wherein said device further includes at least one bias spring for biasing said load applying portion upwardly and away from contacting said load measuring means in normal non-operating condition of said device.

5. The device, according to claim 1, wherein said control means further includes an alarm means which is operably connected to said processing means for annunciating a condition wherein measured weight of said luggage article equals to or exceeds a preselected weight stored within a memory of said control means.

6. The device, according to claim 5, wherein said control means further includes a switch means enabling a user of said device to preselect a weight of such luggage article to be annunciated.

7. The device, according to claim 5, wherein said control means further includes a selector switch means which is manually operable by the user for enabling the user to selectively turn said alarm means on and off.

8. The device, according to claim 1, wherein said control means further includes a selector switch means for enabling a user of said device to selectively display said weight in one of pounds and kilograms.

9. The device, according to claim 1, wherein said control means is mounted within a cavity formed in a top surface of said handle.

10. The device, according to claim 1, wherein said control means includes an enclosure which is disposed on and secured to said first portion of said handle.

11. The device, according to claim 1, wherein said device includes said source of electrical power supply.

12. The device, according to claim 11, wherein said power supply source is at least one battery.

13. The device, according to claim 12, wherein said at least one battery is disposed within a cavity formed in said first portion of said handle and wherein said device further includes a cover means for selectively covering and uncovering said at least one battery.

14. The device, according to claim 1, wherein said device further includes a grip means which is mounted on said bottom surface of said first portion of said handle for facilitating handling of said device.

15. The device, according to claim 14, wherein said grip means includes a plurality of spaced-apart ribs formed on said bottom surface of said first portion and plurality of concave recesses each formed between a pair of adjacently disposed ribs.

\* \* \* \* \*